(12) United States Patent
Fujiki et al.

(10) Patent No.: US 9,819,019 B2
(45) Date of Patent: Nov. 14, 2017

(54) ALL SOLID SECONDARY BATTERY AND METHOD OF PREPARING ALL SOLID SECONDARY BATTERY

(71) Applicant: Samsung Electronics Co., Ltd., Suwon-si, Gyeonggi-do (KR)

(72) Inventors: Satoshi Fujiki, Yokohama (JP); Heidy Visbal, Yokohama (JP); Hajime Tsuchiya, Yokohama (JP); Yuichi Aihara, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 47 days.

(21) Appl. No.: 14/567,389

(22) Filed: Dec. 11, 2014

(65) Prior Publication Data
US 2015/0171428 A1    Jun. 18, 2015

(30) Foreign Application Priority Data

Dec. 13, 2013    (JP) .................................. 2013-258715
Dec. 4, 2014    (KR) ......................... 10-2014-0173236

(51) Int. Cl.
*H01M 4/525* (2010.01)
*H01M 10/0562* (2010.01)
*H01M 10/058* (2010.01)
*H01M 10/052* (2010.01)
(Continued)

(52) U.S. Cl.
CPC ......... *H01M 4/525* (2013.01); *H01M 10/052* (2013.01); *H01M 10/058* (2013.01); *H01M 10/0562* (2013.01); *H01M 2/0285* (2013.01); *H01M 2/0287* (2013.01); *H01M 10/0404* (2013.01); *H01M 2300/0068* (2013.01); *Y10T 29/49108* (2015.01)

(58) Field of Classification Search
CPC . H01M 4/525; H01M 10/126; H01M 10/0404
See application file for complete search history.

(56) References Cited

U.S. PATENT DOCUMENTS 6,713,987 B2    3/2004  Krasnov et al.
7,041,239 B2 *  5/2006  Barker .................... H01M 4/13
                                                       252/518.1
(Continued)

FOREIGN PATENT DOCUMENTS

CN        101593850    * 12/2009
EP        2099087 B1     12/2010
(Continued)

*Primary Examiner* — Ula C Ruddock
*Assistant Examiner* — Thomas Parsons
(74) *Attorney, Agent, or Firm* — Cantor Colburn LLP (57) ABSTRACT

An all solid secondary battery including: an exterior body; a cathode including a cathode active material including a transition metal oxide, an anode; and a solid electrolyte layer disposed between the cathode and the anode, wherein the cathode, the anode, and the solid electrolyte layer are disposed in the exterior body, wherein the transition metal oxide is a lithium composite transition metal oxide that contains nickel and at least one metal element other than nickel that belongs to Group 2 to Group 13 of the periodic table, and wherein the total of partial pressures of carbon dioxide and oxygen in the exterior body is 200 pascals or less.

18 Claims, 2 Drawing Sheets

(51) Int. Cl.
  *H01M 2/02* (2006.01)
  *H01M 10/04* (2006.01)

(56) References Cited

U.S. PATENT DOCUMENTS

| | | |
|---|---|---|
| 8,283,388 B2 * | 10/2012 | Nakamoto .......... H01M 10/052 |
| | | 252/182.1 |
| 8,309,258 B2 | 11/2012 | Kanamura et al. |
| 8,870,976 B2 | 10/2014 | Kondo et al. |

FOREIGN PATENT DOCUMENTS

| JP | 1996-167425 A | | 6/1996 |
|---|---|---|---|
| JP | 2005-519425 A | | 6/2005 |
| JP | 2008-059954 A | | 3/2008 |
| JP | 2010-033937 A | | 2/2010 |
| JP | 4601917 B2 | | 10/2010 |
| JP | 2002-231313 A | | 1/2011 |
| JP | 2010033937 | * | 2/2012 |
| JP | 2013-008550 A | | 1/2013 |

* cited by examiner

ALL SOLID SECONDARY BATTERY AND METHOD OF PREPARING ALL SOLID SECONDARY BATTERY

RELATED APPLICATIONS

This application claims priority to and the benefit of Japanese Patent Application No. 2013-258715, filed on Dec. 13, 2013, in the Japanese Intellectual Property Office, and Korean Patent Application No. 10-2014-0173236, filed on Dec. 4, 2014, in the Korean Intellectual Property Office, and all the benefits accruing therefrom under 35 U.S.C. §119, the contents of which are incorporated herein in their entirety by reference.

BACKGROUND

1. Field

The present disclosure relates to an all solid secondary battery, and more particularly, to an all solid secondary battery using a nickel-containing transition metal oxide as a cathode active material.

2. Description of the Related Art

All solid secondary batteries using a solid electrolyte degrade over time. Thus there remains a need for an improved all solid battery.

SUMMARY

Provided is an all solid secondary battery having a high energy density, wherein function of a lithium nickel oxide as a cathode active material in the battery is improved by preventing the source of lithium carbonate generation.

Additional aspects will be set forth in part in the description which follows and, in part, will be apparent from the description.

According to an aspect, an all solid secondary battery includes: an exterior body; a cathode including a cathode active material including a transition metal oxide, an anode; and a solid electrolyte layer disposed between the cathode and the anode, wherein the cathode, the anode, and the solid electrolyte layer are disposed in the exterior body, wherein the transition metal oxide is a lithium composite transition metal oxide including nickel and at least one metal element other than nickel that belongs to Group 2 to Group 13 of the periodic table, and wherein a total of partial pressures of carbon dioxide and oxygen in the exterior body is 200 pascals or less.

In this regard, generation of lithium carbonate on a surface of the cathode active material in the all solid secondary battery may be suppressed, and thus an electrical resistance of the battery may be decreased.

The at least one metal element other than nickel may be selected from cobalt, manganese, aluminum, and magnesium.

The transition metal oxide may have a layered rock-salt structure.

The transition metal oxide may be represented by Formula 1:

$$Li_xNi_yM_zO_2 \qquad \text{Formula 1}$$

wherein, in Formula 1, M is at least one element selected from the group consisting of Co, Mn, Al, and Mg; and x, y, and z are values that satisfy $0.5<x<1.2$, $0.5<y<1$, $0<z$, and $z=1-y$.

The transition metal oxide may be represented by Formula 2:

$$Li_xNi_yCo_aM'_bO_2 \qquad \text{Formula 2}$$

wherein, in Formula 2, M' is at least one element selected from the group consisting of Mn, Al, and Mg; and x, y, and z are values that satisfy $0.9<x<1.1$, $0.5<y<1.0$, $0<a<0.3$, $0\le b<0.3$, and $y+a+b=1$.

The transition metal oxide may be represented by Formula 3:

$$Li_xNi_yCo_aAl_bO_2 \qquad \text{Formula 3}$$

wherein, in Formula 3, x, y, and z are values that satisfy $0.9<x<1.1$, $0.6<y<1.0$, $0<a<0.2$, $0<b<0.2$, and $y+a+b=1$.

The transition metal oxide may be represented by Formula 4:

$$Li_xNi_yCo_aMn_bO_2 \qquad \text{Formula 4}$$

wherein, in Formula 4, x, y, and z are values that satisfy $0.9<x<1.1$, $0.6<y<1.0$, $0<a<0.2$, $0<b<0.2$, and $y+a+b=1$.

The transition metal oxide may be represented by Formula 5:

$$Li_xNi_yCo_aMg_bO_2 \qquad \text{Formula 5}$$

wherein, in Formula 5, x, y, and z are values that satisfy $0.9<x<1.1$, $0.6<y<1.0$, $0<a<0.2$, $0<b<0.2$, and $y+a+b=1$.

In the all solid secondary battery, carbon dioxide and oxygen in the exterior body may be substituted with an inert gas, and the total of the partial pressures of carbon dioxide and oxygen may be 20 pascals (Pa) or less.

The inert gas may be at least one gas that is selected from helium, nitrogen, neon, argon, krypton, and xenon. When carbon dioxide and oxygen within the exterior body are substituted with an inert gas, a process that deteriorates the total of the partial pressures of the carbon dioxide and oxygen may be reduced or prevented.

A solid electrolyte of the solid electrolyte layer may be a sulfide-based solid electrolyte.

The solid electrolyte of the solid electrolyte layer may include sulfur (S) as a first element, lithium (Li) as a second element, and at least one element selected from silicon (Si), boron (B), and phosphorous (P) as a third element. The solid electrolyte has a high ion conductivity and thus contributes to improvement of energy density of the all solid secondary battery.

The solid electrolyte of the solid electrolyte layer may include $Li_2S$—$P_2S_5$.

The total of the partial pressures of carbon dioxide and oxygen in the exterior body may be 150 Pa or less.

The total of the partial pressures of carbon dioxide and oxygen in the exterior body may be 50 Pa or less.

In an infrared (IR) spectrum obtained from diffuse reflection IR measurement of the cathode active material after a first cycle of charging and discharging the battery, a peak may not be observed within a range of about 1400 inverse-centimeters ($cm^{-1}$) to about 1600 $cm^{-1}$.

According to another aspect, a method of preparing an all solid secondary battery includes: providing all solid secondary battery by disposing a cathode including a cathode active material including a transition metal oxide represented by Formula 1, an anode, and a solid electrolyte layer disposed between the cathode and the anode within an exterior body $$Li_xNi_yM_zO_2 \qquad \text{Formula 1}$$

wherein, in Formula 1, M is at least one element selected from the group consisting of Co, Mn, Al, and Mg; and x, y, and z are values that satisfy $0.5<x<1.2$, $0.5<y<1$, $0<z$, and $z=1-y$; and decreasing partial pressures of carbon dioxide and oxygen in the exterior body.

The decreasing of the partial pressures of carbon dioxide and oxygen in the exterior body may be performed until the total of partial pressures of carbon dioxide and oxygen in the exterior body is 200 Pa or less. In this regard, an amount of carbon dioxide and oxygen present within the structure of the all solid secondary battery may decrease. As a result, generation of lithium carbonate, which is a resistive component, may be suppressed. The decreasing of the partial pressures of carbon dioxide and oxygen in the exterior body may be performed by evacuating an inside of the exterior body or by substituting the carbon dioxide and oxygen with an inert gas in the exterior body.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or."

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In an all solid secondary battery comprising a compound that has a layered rock-salt structure as a cathode active material, when the battery is charged in the presence of carbon dioxide or oxygen, a resistive component is generated at an interface between the cathode active material and a solid electrolyte, thereby causing an increase in resistance of the battery.

Because of its high discharge capacity, lithium nickel oxide has received attention as a cathode active material having a layered rock-salt structure. However, since the lithium nickel oxide is chemically unstable, in many cases, a portion of nickel in the lithium nickel oxide is substituted with other transition metal. Such substituted lithium nickel oxides may be synthesized by reacting a lithium carbonate, a lithium hydroxide, and a compound which serves as a transition metal source. In the synthesis method, the lithium hydroxide may be added in stoichiometric excess, and thus remaining unreacted lithium hydroxide can be attached on a surface of the synthesized product. While not wanting to be bound by theory, it is thus understood that current cathode active materials are understood to include lithium hydroxide attached on a surface the cathode active material.

Carbon dioxide or oxygen is understood to be present within a battery structure of an all solid secondary battery. Thus, when the lithium hydroxide attached on the cathode active material reacts with carbon dioxide and the like, lithium carbonate is generated on the surface of the cathode active material. The lithium carbonate becomes a resistive component at an interface between the cathode active material and a solid electrolyte and suppresses a discharge capacity of the secondary battery.

That is, the transition metal oxide, in which a portion of the nickel of a lithium nickel oxide is substituted with another transition metal, is a more stable cathode active material that can provide improved capacity, but an interfacial resistance may be easily formed at an interface between the cathode active material and a solid electrolyte. Thus, when a transition metal oxide is used as a cathode active material, improvement of a discharge capacity by suppressing an amount of the generated resistive component is desired.

In order to suppress generation of the resistive component, a method of preparing an all solid secondary battery can include preparation in a regenerated argon atmosphere. However, preparation in a regenerated argon atmosphere uses a high capital expenditure in equipment and thus is not appropriate for preparation or mass production of a large-sized cell. Alternatively, a solid battery can be vacuum-sealed in a laminate film. However, a suitable type or a surface state of a cathode active material, which is a material for obtaining high energy, has not been disclosed, and it is expected that industrial production of such a solid battery in a laminate film may be difficult.

In this regard, suppression of lithium carbonate generation within a battery structure is desired.

Hereinafter, according to an embodiment, an all solid secondary battery and a method of preparing an all solid secondary battery will be disclosed in further detail.

"Alkali metal" means a metal of Group 1 of the Periodic Table of the Elements, i.e., lithium, sodium, potassium, rubidium, cesium, and francium.

As used herein, the term "an alkaline earth metal" denotes an element that belongs to Group 2 of the periodic table.

As used herein, the term "a transition metal" denotes an element that belongs to Group 3 to Group 12 of the periodic table.

All Solid Secondary Battery

Figure 1:
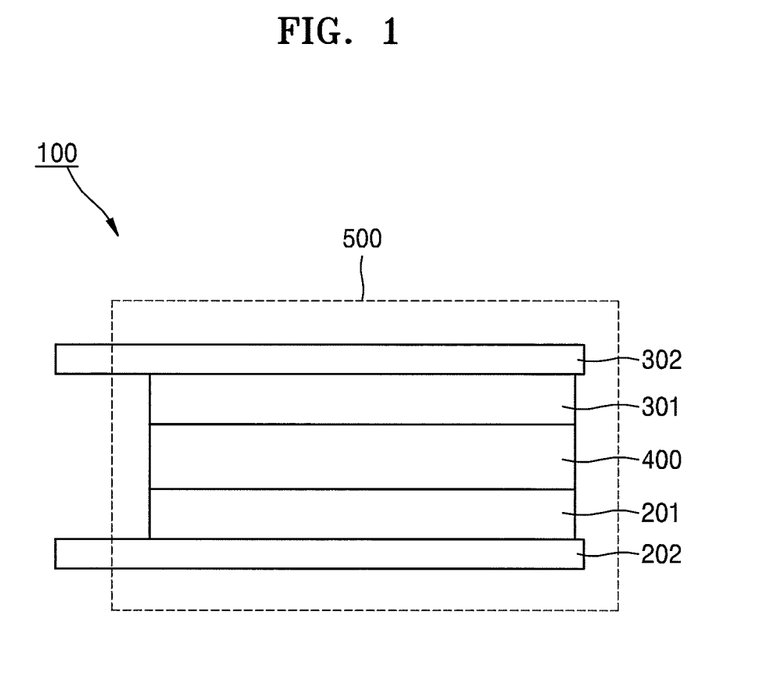
FIG. 1 is a schematic plan view of an embodiment of an all solid secondary battery.
Figure 2:
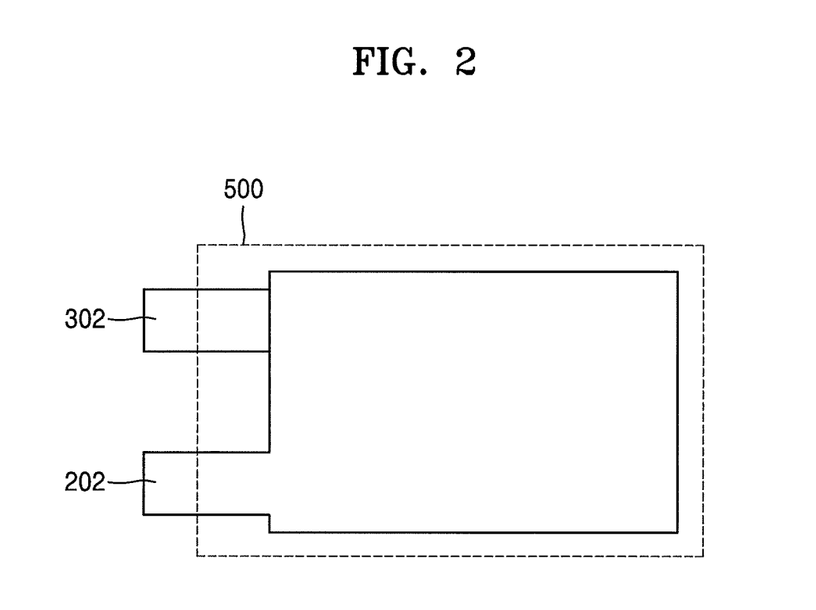
FIG. 2 is a schematic cross-sectional view of an embodiment of an all solid secondary battery.

An all solid secondary battery according to an embodiment has a structure comprising a cathode, an anode, and a solid electrolyte disposed between the cathode and the anode, wherein the structure is accommodated in an exterior body. FIG. 1 is a schematic plan view of an embodiment of an all solid secondary battery, and FIG. 2 is a schematic cross-sectional view of another embodiment of an all solid secondary battery. In FIGS. 1 and 2, 100 is an all solid secondary battery, 201 is a cathode, 202 is a current collector, 301 is an anode, 302 is a current collector, 400 is a solid electrolyte layer, and 500 is an exterior body.

Cathode

A cathode in the all solid secondary battery at least includes a cathode active material, a solid electrolyte, a conducting agent, and a binder. The cathode active material may be a lithium composite transition metal oxide, in which the transition metal oxide contains nickel and at least one metal element that belongs to Groups 2 to 13 of the periodic table, other than nickel. The at least one metal element may be selected from cobalt, manganese, aluminum, and magnesium. The cathode active material is a transition metal oxide represented by Formula 1. In Formula 1, M is at least one element selected from Co, Mn, Al, and Mg. Also, x, y, and z are values that satisfy $0.5<x<1.2$, $0.5<y<1$, $0<z$, and $z=1-y$.

$$Li_xNi_yM_zO_2 \qquad \text{Formula 1}$$

The transition metal oxide is capable of reversible intercalation and deintercalation of lithium ions and has a layered rock-salt structure. As used herein, the term "layered" denotes a structure having a sheet shape. As used herein, the term "a rock-salt structure" refers to a sodium chloride type structure as a crystal structure in which face-centered cubic lattices respectively formed of cations and anions are shifted by a half of the corner of each unit lattice. The transition metal oxide having a composition ratio represented by Formula 1 has high ion conductivity. In this regard, a discharge capacity of the all solid secondary battery may be improved. Further, the transition metal oxide is chemically stable.

Examples of the transition metal oxide represented by Formula 1 may include a lithium nickel composite oxide (e.g., $LiNiO_2$), a lithium nickel cobalt composite oxide (e.g., $LiNiCoO_2$), a lithium nickel cobalt manganese composite oxide (e.g., $LiNiCoMnO_2$), and preceding transition metal oxides partially substituted with magnesium or aluminum. For example, the transition metal oxide may be $LiNiCoAlO_2$ or $LiNiCoMnO_2$. These preceding transition metal oxides may be used alone or in a combination thereof.

For example, the transition metal oxide may be represented by Formula 2.

$$Li_xNi_yCo_aM'_bO_2 \qquad \text{Formula 2}$$

In Formula 2, M' is at least one element selected from Mn, Al, and Mg, and x, y, and z are values that satisfy $0.9<x<1.1$, $0.5<y<1.0$, $0<a<0.3$, $0\leq b<0.3$, and $y+a+b=1$.

For example, the transition metal oxide may be represented by Formula 3.

$$Li_xNi_yCo_aAl_bO_2 \qquad \text{Formula 3}$$

In Formula 3, x, y, and z are values that satisfy $0.9<x<1.1$, $0.6<y<1.0$, $0<a<0.2$, $0<b<0.2$, and $y+a+b=1$.

For example, the transition metal oxide may be represented by Formula 4

$$Li_xNi_yCo_aMn_bO_2 \qquad \text{Formula 4}$$

In Formula 4, x, y, and z are values that satisfy $0.9<x<1.1$, $0.6<y<1.0$, $0<a<0.2$, $0<b<0.2$, and $y+a+b=1$.

For example, the transition metal oxide may be represented by Formula 5.

$$Li_xNi_yCo_aMg_bO_2 \qquad \text{Formula 5}$$

In Formula 5, x, y, and z are values that satisfy $0.9<x<1.1$, $0.6<y<1.0$, $0<a<0.2$, $0<b<0.2$, and $y+a+b=1$.

The cathode active material may be commercially available or may be synthesized using a method known in the art. For example, in order to synthesize $LiNiCoAlO_2$, an aluminum hydroxide, a lithium hydroxide, a lithium carbonate, and a cobalt hydroxide may be mixed and calcined at a high temperature in a range of about 700° C. to about 800° C. Since a lithium hydroxide is highly volatile, the lithium hydroxide may be added in stoichiometric excess during the mixing of the starting materials. The product obtained after the calcinations may be pulverized until a particle diameter of the pulverized resultant is appropriate to be used as the cathode active material. In the all solid secondary battery, in terms of securing a large interface between the cathode active material and the solid electrolyte, the cathode active material may have a small particle diameter. For example, a particular range of the particle diameter may be in a range of about 0.1 micrometers (μm) to about 20 μm. For example, a particular range of the particle diameter may be in a range of about 1 μm to about 10 μm.

As described above, in the synthesis of a cathode active material, a lithium hydroxide may be added at an excessive amount so that unreacted lithium hydroxide may be easily attached to the obtained product. It is presumed that the lithium hydroxide reacts with carbon dioxide or oxygen in the exterior body of the all solid secondary battery during charging/discharging and generates a resistive component. The resistive component becomes an interfacial resistance between the cathode active material and the solid electrolyte, and thus degrades an output of the all solid secondary battery. Thus, an amount of the generated resistive component needs to be suppressed. In the all solid secondary battery, an amount of carbon dioxide or oxygen in the exterior body is decreased to a predetermined partial pressure. In this regard, production of the resistive component may be suppressed.

In order to secure a large surface of an interface between the cathode active material and the solid electrolyte, a solid electrolyte may be contained in the cathode. The solid electrolyte contained in the cathode may comprise the same material of the solid electrolyte layer, which will be further disclosed in additional detail, or may comprise a material different from that of the solid electrolyte layer. Examples of the solid electrolyte will be described in connection with the description of the solid electrolyte layer.

The conducting agent included in the cathode may comprise any suitable material known in the art as long as the material contributes in improvement of conductivity. Examples of the conducting agent include Ketjen black, acetylene black, graphite, natural graphite, and artificial graphite.

The binders included in the cathode may be a hydrocarbon-based polymer compound having a molecular weight in a range of about 100 Daltons (Da) to about 100,000 Da. A compound having a molecular weight of less than 100 can have a weak binding property and thus may not be appropriate to be used as a binder in the all solid secondary battery. When a compound having a molecular weight of greater than 100,000 Da is used to form a cathode on a current collector, a viscosity of a cathode mixture thus prepared is high, and thus coating property of a cathode slurry may be deteriorated.

Examples of the binder may include a styrene-based thermoplastic elastomer such as a styrene-butadiene-styrene block copolymer (SBS), a styrene-ethylene-butadiene-styrene block copolymer (SEBS), or a styrene-(styrene butadiene)-styrene block copolymer, a styrene-butadiene rubber (SBR), a butadiene rubber (BR), a natural rubber (NR), an isoprene rubber (IR), an ethylene-propylene-diene terpolymer (EPDM), and partially or fully hydrogenated products thereof. In addition, examples of the binder may include polystyrene, polyolefin, an olefin-based thermoplastic elastomer, polycycloolefin, and a silicon resin. The binder may be a combination of two different types selected from the examples of the binder.

An exemplary method of preparing a cathode of the all solid secondary battery may include, but not limited to, coating a cathode mixture in a slurry state on a current collector and drying the cathode mixture to remove a solvent in the slurry. The current collector may be any conducting material. Examples of the current collector may include copper, nickel, titanium, or aluminum in a sheet-like shape or a film-like shape. The solvent used in preparation of the cathode mixture in a slurry state may be a non-polar solvent. In particular, examples of the solvent may include an aromatic hydrocarbon such as toluene, xylene, or ethylbenzene, and an aliphatic hydrocarbon such as pentane, hexane, or heptanes. In this regard, a property and a physical state of the cathode mixture may be maintained as those of slurry.

For example, an amount of the cathode active material may be in a range of about 60 parts to about 95 parts by weight, or, for example, about 70 parts to about 90 parts by weight, based on 100 parts by weight of the cathode. For example, an amount of the solid electrolyte may be in a range of about 5 parts to about 40 parts by weight, or, for example, about 10 parts to about 30 parts by weight, based on 100 parts by weight of the cathode. When the cathode active material and the solid electrolyte are contained in the cathode within these ranges, respectively, the cathode may have good ion conductivity.

The coating of the cathode mixture on the current collector may be performed using a dye coater or a doctor blade. The solvent in the cathode mixture coated on the current collector may be removed by heat-treatment. A temperature for the heat-treatment may be in a range of about 40° C. to about 100° C., and a period of time for the heat-treatment may be in a range of about 10 minutes to about 30 minutes.

Solid Electrolyte Layer

In the all solid secondary battery, a solid electrolyte layer may include a binder or a conducting agent in addition to a solid electrolyte. The binder or the conducting agent may be the same materials that are used in the cathode.

The solid electrolyte in the all solid secondary battery may be a solid electrolyte known in the art, and examples of the solid electrolyte may include a phosphate-based solid electrolyte, a sulfide-based solid electrolyte, and the like. Examples of the solid electrolyte may include $Li_3N$, $Li_{2+2x}Zn_{1-x}GeO_4$ wherein 0<x<1 (LISICON), lithium phosphate oxynitride (LIPON), $Li_{3.25}Ge_{0.25}P_{0.75}S_4$ (thio-LiSICON), and $Li_2O-Al_2O_3-TiO_2-P_2O_5$ (LATP). For example, the solid electrolyte may be a sulfide-based solid electrolyte containing sulfur (S) as a first element, lithium (Li) as a second element, and at least one element selected from the group consisting of silicon (Si), boron (B), and phosphorous (P) as a third element. In order to increase an ion conductivity, germanium (Ge) may be contained in the solid electrolyte in addition to these elements.

Examples of the sulfide-based solid electrolyte may include $Li_3PS_4$, $Li_4P_2S_7$, $Li_4SiS_4$, $Li_2S-P_2S_5$, and $50Li_4SiO_4 \cdot 50Li_3BO_3$. The sulfide-based solid electrolyte may be amorphous, crystalline, glass, or glass-ceramic. For example, since an amorphous solid electrolyte has a tendency of high ion conductivity, the sulfide-based solid electrolyte may be amorphous. An ion conductivity of the sulfide-based solid electrolyte in the all solid secondary battery may be in a range of, for example, about $10^{-2}$ siemens per centimeter (S/cm) to about $10^{-5}$ S/cm. When a solid electrolyte has an ion conductivity of lower than $10^{-5}$ S/cm, a charging/discharging capacity of the battery can be significantly reduced.

Although a method of preparing the sulfide-based solid electrolyte layer is not particularly limited, the method may include coating a solid electrolyte mixture in a slurry state on a support formed of polyethyleneterephthalate (PET) and drying the slurry to remove the solvent therefrom. For the removing of the solvent, a temperature may be in a range of, for example, about 40° C. to about 100° C., and a period of time may be in a range of, for example, about 10 minutes to about 30 minutes. The solid electrolyte layer thus obtained may be detached from the support and then may be included in the secondary battery structure. Alternatively, a method of preparing the sulfide-based solid electrolyte layer may include stirring solid electrolyte powder and a binder powder by using a ball mill and then press-molding the mixture.

A binder or an inorganic compound, in addition to the solid electrolyte, may be added to the mixture. The binder or the inorganic compound may comprise the same material that is added to the cathode mixture. For example, an amount of the added solid electrolyte may be in a range of about 90 parts to about 99.9 parts by weight, for example, about 95 parts to about 99.5 parts by weight, based on 100 parts by weight of the solvent. A coating method and a drying method of the solid electrolyte mixture are the same with those used for the preparation of the cathode mixture.

As a preparation method of the solid electrolyte, a mechanical milling method (MM method) may be used. The MM method may include finely pulverizing and mixing the starting materials by adding the starting materials and a ball mill in a reactor and intensely stirring the contents in the reactor. In this case, $Li_2S$ and $P_2S_5$ as the starting materials may be mixed at a weight ratio in a range of about 60:40 to about 80:20. When an amount of $Li_2S$ in the mixture is out of this range, an ion conductivity appropriate for the use of the all solid secondary battery may not be obtained.

A solvent may be removed by performing heat-treatment on a solid electrolyte mixture solution coated on a support. The solid electrolyte mixture solution is vacuum-dried after the heat-treatment to obtain a solid electrolyte layer that is used in the all solid secondary battery. For example, the vacuum-dry may be performed at a temperature in a range of about 30° C. to about 100° C., for example, about 40° C. to about 80° C. The solid electrolyte layer may be detached from the support. A thickness of the solid electrolyte layer may be in a range of, for example, about 50 μm to about 300 μm.

Anode

An anode in the all solid secondary battery may at least contain an anode active material and a binder, as well as, a solid electrolyte. When the anode contains the solid electrolyte, an area of an interface between the anode active material and the solid electrolyte increases, and thus many ion conducting pathways may be secured.

The anode active material included in the anode may be any suitable material known in the art, such as an all-metal, an alloy, or a conducting material containing a metal, as long as the material is capable of intercalation and deintercalation of metal ions. The anode active material may be a lithium metal, a metal such as lithium, indium, tin, aluminum, silicon, or an alloy thereof, or a transition metal oxide such as $Li_{4/3}Ti_{5/3}O_4$ or SnO. Also, a carbon material pre-doped with lithium ions according to a method known in the art may be used as an anode active material. The carbon material may be graphite which may react with lithium ions and form an interlayer compound. The anode active material may be used alone or as a mixture thereof.

In particular, examples of the metal include at least one selected from Sn, Al, Ge, Pb, Bi, Sb, a Si—X alloy (where, X is at least one element selected from an alkali metal, an alkaline earth metal, a Group 13 element, a Group 14 element, a transition metal, and a rare earth element, except for Si), and a Sn—X alloy (where, X is at least one element selected from an alkali metal, an alkaline earth metal, a Group 13 element, a Group 14 element, a transition metal, and a rare earth element, except for Sn). X may be at least one element selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), and polonium (Po).

Examples of the transition metal oxide are a lithium titanium oxide, a vanadium oxide, and a lithium vanadium oxide.

Examples of the non-transition metal oxide include $SnO_2$ and $SiO_x$ (0<x<2).

Examples of the carbonaceous material are crystalline carbon, amorphous carbon, and mixtures thereof. Examples of the crystalline carbon are graphite, such as natural graphite or artificial graphite that is in amorphous, plate, flake, spherical, or fibrous form. Examples of the amorphous carbon include soft carbon (carbon sintered at low temperatures), hard carbon, mesophase pitch carbides, and sintered cokes.

Examples of the anode active material may include artificial graphite, natural graphite, a mixture of artificial graphite and natural graphite, and natural graphite coated with artificial graphite. The solid electrolyte may be a solid electrolyte known in the art. The solid electrolyte may be the same material used in the solid electrolyte layer or may be different material.

Although a method of preparing the anode is not particularly limited, the same method used in preparation of the cathode may be used. That is, an anode mixture in a slurry state may be prepared by adding an anode active material, a binder, a conducting agent, and a solid electrolyte, and the anode mixture may be coated and dried on a current collector to form the anode. For example, an amount of the anode active material may be in a range of about 60 parts to about 95 parts by weight, for example, about 75 parts to about 90 parts by weight based on 100 parts by weight of the anode. For example, an amount of the solid electrolyte may be in a range of about 5 parts to about 40 parts by weight, for example, about 10 parts to about 25 parts by weight based on 100 parts by weight of the anode. When the amounts of the anode active material and the solid electrolyte are within these ranges, the anode may have good ion conductivity. A coating method or a drying method of the anode mixture may be the same with those used in coating and drying of the cathode mixture.

Preparation Method of all Solid Secondary Battery

A method of preparing the all solid secondary battery will be further disclosed hereinafter. First, a solid electrolyte layer may be disposed between the cathode and the anode prepared in the manner described above and press-molded to assemble a cell. The assembled cell may then be mounted inside an exterior body. After mounting the cell in the exterior body, partial pressures of carbon dioxide and oxygen in the exterior body are decreased, and then the exterior body is hot-pressed to be sealed. Examples of the exterior body may include a laminate pack of aluminum or stainless or a metal container having a cylindrical shape or a box shape.

Process of Decreasing Partial Pressures of Carbon Dioxide and Oxygen

In the all solid secondary battery, the partial pressures of carbon dioxide and oxygen are decreased so that the total partial pressure of carbon dioxide and oxygen in the exterior body is about 200 pascals (Pa) or lower after the present process. For example, the total partial pressure, as the sum of partial pressure values, may be in a range of about 0 Pa to about 150 Pa. Lower partial pressures are preferred. For example, the total partial pressure is the sum of partial pressure values of carbon dioxide and oxygen, which may be in a range of about 0 Pa to about 100 Pa. For example, the total partial pressure is the sum of partial pressure values, which may be in a range of about 0 Pa to about 50 Pa. For example, the total partial pressure is the sum of partial pressure values, which may be in a range of about 0 Pa to about 20 Pa. In this regard, production of lithium carbonate due to reaction between lithium hydroxide and carbon dioxide or oxygen in the exterior body while charging/discharging the all solid secondary battery may be suppressed.

The all solid secondary battery includes a transition metal oxide as a cathode active material. The transition metal oxide may be used in a state having a lithium hydroxide attached thereon, as a starting material. However, in the all solid secondary battery according to an embodiment, since the sum of the partial pressures of carbon dioxide and oxygen in the exterior body is decreased, in spite of using the transition metal oxide with lithium hydroxide attached thereon as a cathode active material, an amount of the produced lithium carbonate decreases. Therefore, an interfacial resistance between the cathode active material and the solid electrolyte may be decreased.

An example of a method of decreasing partial pressures of carbon dioxide and oxygen may include evacuation of an interior of the exterior body. Evacuation may comprise evacuation to 100 Pa to 0.0001 Pa, or 10 Pa to 0.001 Pa, or 1 Pa to 0.01 Pa. Alternatively, carbon dioxide or oxygen in the exterior body may be substituted using an inert gas, e.g., by disposing the inert gas in the body, for example by flushing with the inert gas or by evacuating and back-filling with the inert gas. In the case of evacuation, the method may be performed by using a vacuum apparatus. An inert gas may be introduced into the exterior body after the evacuation. Further, when a cell is prepared or disposed in the exterior body in an inert atmosphere, a process of the evacuation may be omitted, and thus a production cost may decrease. The inert gas may be at least one gas selected from helium, nitrogen, neon, argon, krypton, and xenon.

Figure 3:
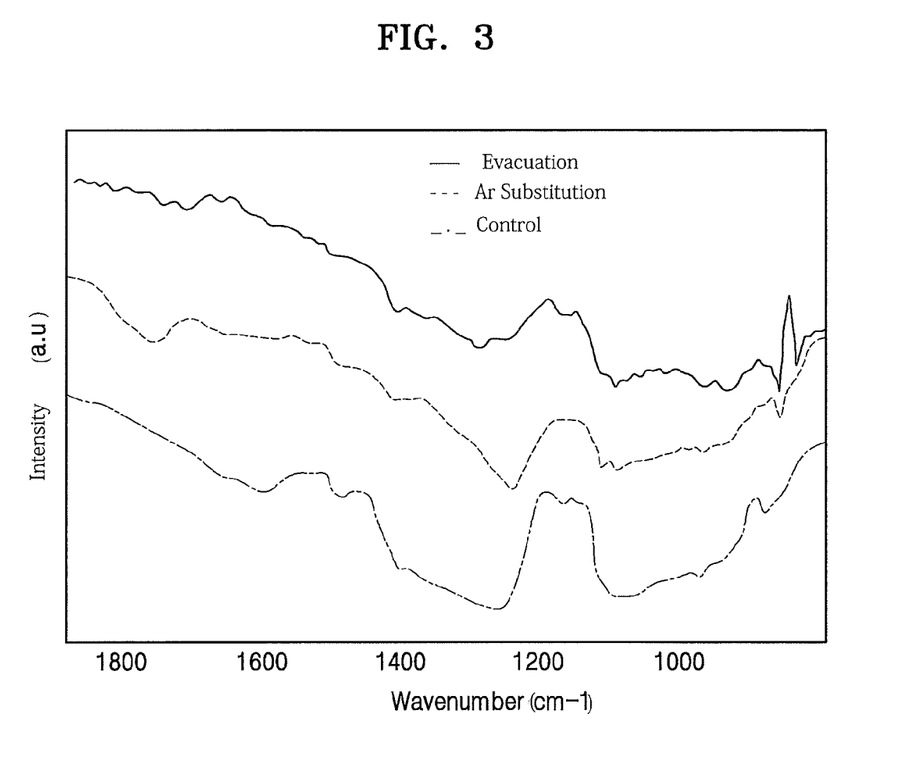
FIG. 3 is a graph of intensity (arbitrary units, a. u.) versus wavenumber (inverse centimeters, $cm^{-1}$) showing the results of diffuse reflection IR spectrum measurement of an amount of lithium carbonate present within an exterior body after charging and discharging an all solid secondary battery.

FIG. 3 shows the results of diffuse reflection IR spectrum measurement of a lithium carbonate in an exterior body of an all solid secondary battery after performing one cycle of charging/discharging the battery, where the all solid secondary battery is prepared by sealing a cell having a constitution described hereinafter in the exterior body formed of aluminum laminate. A continuous line in FIG. 3 refers to the case, wherein the process of decreasing partial pressures of carbon dioxide and oxygen is performed by evacuation. A dash line in FIG. 3 refers to the case, wherein the process of decreasing partial pressures of carbon dioxide and oxygen is performed by argon gas substitution after evacuation. An alternate long and short dash line in FIG. 3 refers to a control, wherein the process of decreasing partial pressures of carbon dioxide and oxygen is not performed. The process of decreasing partial pressures of carbon dioxide and oxygen is performed until the sum of partial pressures of carbon dioxide and oxygen is 20 Pa.

Cell Constitution

The cell comprised an aluminum cathode current collector, a $LiNi_{0.8}Co_{0.15}Al_{0.05}O_2$ cathode active material, a $Li_2S$—$P_2S_5$ solid electrolyte layer, a graphite anode active material, and a copper anode current collector, represented as $Al/LiNi_{0.8}Co_{0.15}Al_{0.05}O_2/Li_2S$—$P_2S_5$/graphite/Cu.

Diffuse Reflection IR Spectrum Measurement

The all solid secondary battery is disassembled in an argon box, the cathode active material taken therefrom is charged in a sample holder, transferred to FT/1R-6200 (available from Jasco) using a vacuum chamber so that the sample does not contact the air, and thus the diffuse reflection IR measurement may be performed.

As shown in FIG. 3, when the process of decreasing partial pressures of carbon dioxide and oxygen is not performed, a peak is observed within a range of about 1400 $cm^{-1}$ to about 1600 $cm^{-1}$. From the measurement result, a significant presence of lithium carbonate in the exterior body is shown. Alternatively, when the process of decreasing partial pressures of carbon dioxide and oxygen to the predetermined value is performed, a peak is not observed within this range. That is, it may be understood that an amount of lithium carbonate present in the exterior body is extremely small and that an amount of the generated lithium carbonate by reaction between the lithium hydroxide attached on the cathode active material and carbon dioxide and/or oxygen is suppressed. That is, when the partial pressures of carbon dioxide and oxygen in the exterior body are decreased, production of lithium carbonate may be suppressed, and thus resistance at an interface between the cathode active material and the solid electrolyte may decrease.

EXAMPLE

An embodiment will be described in further detail with reference to the following examples. However, these examples are for illustrative purposes only and shall not limit the scope of the disclosure.

Example 1

Preparation of Cathode Structure

A ternary powder as a cathode active material, A $Li_2S$—$P_2S_5$ (80:20 mol %) amorphous powder as a sulfide-based solid electrolyte, and a vapor-grown carbon fiber powder as a cathode conducting material (a conducting agent) were weighted at a weight ratio of 60:35:5 and mixed using a rotation and revolution mixer.

A dehydrated xylene solution, in which SBR as a binder is dissolved, was added to the mixture powder, so that an amount of SBR is 5.0 weight percent (wt %), based on the total weight of the mixture powder, to prepare a primary mixture solution. An appropriate amount of dehydrated xylene for controlling a viscosity was added to the primary mixture solution to prepare a secondary mixture solution. Further, in order to improve dispersibility of the mixture powder, a zirconium oxide ball having a diameter of 5 mm was added to a milling container so that an empty space, the mixture powder, and the zirconium oxide ball each occupied ⅓ of the total volume of the milling container, and thus a tertiary mixture solution was prepared. The tertiary mixture solution was added to a rotation and revolution mixer and stirred at a rate of 3000 rpm for 3 minutes to prepare a cathode mixture.

An aluminum foil current collector having a thickness of about 15 μm was prepared as a cathode current collector, the cathode current collector was disposed on a desktop screen printer, and the cathode mixture was applied on a sheet by using a metal mask having a thickness of about 150 μm. The sheet with the cathode mixture applied thereon was dried on a hot plate at a temperature of 60° C. for 30 minutes, and then vacuum-dried at temperature of 80° C. for 12 hours. In this regard, a cathode layer was formed on the cathode current collector. The total thickness of the cathode current collector and the cathode layer after the drying process was about 160 μm.

The sheet formed of the cathode current collector and the cathode layer is pressed using a roll press having a roll gap of about 10 μm to prepare a cathode structure. A thickness of the cathode structure was about 120 μm.

Preparation of Anode Structure

A graphite powder (that is vacuum-dried at temperature of 80° C. for 24 hours) as an anode active material and polyvinylidene fluoride (PVdF) as a binder were weighed at a weight ratio of 95.0:5.0. Further, the materials and an appropriate amount of N-methylpyrrolidone (NMP) were added to a rotation and revolution mixer, stirred at a rate of 3000 rpm for 3 minutes, and degassed for 1 minute to prepare an anode mixture.

A copper film current collector having a thickness of about 16 μm was prepared as an anode current collector, and the anode mixture was coated on the copper current collector by using a blade. A thickness of the anode mixture on the copper current collector was about 150 μm, more or less. A sheet with the anode mixture coated thereon was accommodated in a drier heated to a temperature of 80° C. and dried for 15 minutes. Also, the sheet after the drying was vacuum dried at a temperature of 80° C. for 24 hours. In this regard, an anode structure was prepared. A thickness of the anode structure was about 140 μm, more or less.

Preparation of Electrolyte Layer

A dehydrated xylene solution in which SBR was dissolved was added to a $Li_2S$—$P_2S_5$ (80:20 mol %) amorphous powder as a sulfide-based solid electrolyte, so that an amount of SBR was 2.0 wt %, based on the total weight of the mixture powder, to prepare a primary mixture solution. Also, an appropriate amount of dehydrated xylene for controlling a viscosity was added to the primary mixture solution to prepare a secondary mixture solution. Also, in order to improve dispersibility of the mixture powder, a zirconium oxide ball having a diameter of 5 millimeters (mm) was added to a milling container so that an empty space, the mixture powder, and the zirconium oxide ball each occupied ⅓ of the total volume of the milling container, and thus a tertiary mixture solution was prepared. The tertiary mixture solution was added to a rotation and revolution mixer and stirred at a rate of 3000 rpm for 3 minutes to prepare an electrolyte layer coating solution.

The anode structure was disposed on a desktop screen printer, and the electrolyte layer coating solution was coated on the anode structure by using a metal mask having a thickness of about 500 μm. Then, the sheet with the electrolyte layer coating solution coated thereon was dried on a hot plate at a temperature of 40° C. for 10 minutes, and then vacuum-dried at temperature of 40° C. for 12 hours. In this regard, an electrolyte layer was formed on the anode structure. The total thickness of the electrolyte layer after the drying process was about 300 μm, more or less.

Each of the anode structure and solid electrolyte layer sheet and the cathode structure were cut by a Thompson blade, the electrolyte layer of the sheet and the cathode of the cathode structure were combined by a roll press having a roll gap of about 150 μm by using a dry lamination method, and thus a single cell of a solid battery was assembled.

Sealing of all Solid Secondary Battery

The assembled single cell was put into an aluminum laminate film attached with a terminal, evacuated using a vacuum apparatus up to 100 Pa, and then heat-sealed to perform packing. The sum of partial pressures of oxygen and carbon dioxide in the exterior body after the evacuation was 20 Pa.

Measurement of Inner Pressure of Solid Battery

The solid battery was put in oil, the aluminum laminate film was broken, and thus an amount of gas generated from the battery was measured. An inner pressure of the battery was obtained by comparing an inner volume of the battery and the amount of the generated gas.

Measurement Method of Inner Atmosphere of Solid Battery

Gas in the aluminum laminate film was collected using a syringe, composition of the gas was evaluated by gas chromatography, and thus a ratio of oxygen and a ratio of carbon dioxide in the battery was determined.

Partial Pressure Inside Solid Battery

The inner pressure of the battery and the ratio of oxygen and the ratio of carbon dioxide in the battery determined above were used to calculate partial pressures of oxygen and carbon dioxide.

Examples 2 to 7 and Comparative Examples 1 to 11

In each of Examples 2 to 7 and Comparative Examples 1 to 11, an aluminum laminate film was included in an exterior body by preparing a cathode structure, an anode structure, and a solid electrolyte layer in the same manner as in Example 1, except that the cathode active material was replaced with materials shown in Table 1 and Table 2, respectively. Then, partial pressures of carbon dioxide and oxygen were decreased by using the methods shown in Table 1, respectively, and the aluminum laminate film was packed by heat-sealing and designated as each of Examples 2 to 7 and Comparative Examples 1 to 11.

Atmospheres, single cell capacities, and discharge capacity retention rates within the exterior bodies of Examples 1 to 7 and Comparative Examples 1 to 11 were measured, and the results are shown in Table 1 and Table 2.

Evaluation Method of Single Cell Capacity

A capacity (Ah) of each of the single cells was measured using a charge/discharge evaluation apparatus, TOSCAT-3100 (available from Dongyang Systems, Japan). In Table 1 and Table 2, capacity values of the single cells prepared in Examples 2 to 7 and Comparative Examples 1 to 11 were indexed by setting a capacity value of the single cell prepared in Example 1 as 100.

Calculation Method of Discharge Capacity Retention Rate

A 0.05 C constant current charging/discharging cycle test was performed at room temperature. Discharge capacities after the first cycle were compared. Further, a decreased rate of a discharge capacity after $50^{th}$ cycle with respect to a discharge capacity after the first cycle was calculated as a retention rate of the discharge capacity. The discharge capacity after the $50^{th}$ cycle is represented by Equation 1.

A capacity retention rate after 50$^{th}$ cycle=[A discharge capacity after 50$^{th}$ cycle/a discharge capacity after 1$^{st}$ cycle]×100        Equation 1

TABLE 1

| | Cathode active material | Process of decreasing partial pressures of carbon dioxide and oxygen | Atmosphere in exterior body | Sum of partial pressures of oxygen and carbon dioxide [Pa] | Single cell capacity | Capacity retention rate after 50$^{th}$ cycle [%] |
|---|---|---|---|---|---|---|
| Example 1 | $LiNi_{0.8}Co_{0.15}Al_{0.05}O_2$ | Evacuation to 100 Pa | Air at reduced pressured | 20 | 100 | 84 |
| Example 2 | $LiNi_{0.8}Co_{0.15}Al_{0.05}O_2$ | Filling with high purity argon gas after evacuation to 100 Pa | Argon | 20 | 98 | 83 |
| Example 3 | $LiNi_{0.8}Co_{0.15}Al_{0.05}O_2$ | Filling with high purity nitrogen gas after evacuation up to 100 Pa | Nitrogen | 20 | 96 | 81 |
| Example 4 | $LiNi_{0.8}Co_{0.15}Al_{0.05}O_2$ | Filling with high purity helium gas after evacuation up to 100 Pa | Helium | 20 | 96 | 84 |
| Example 5 | $LiNi_{0.8}Co_{0.15}Al_{0.05}O_2$ | Filling with high purity argon gas after evacuation up to 1000 Pa | Argon | 200 | 93 | 78 |
| Example 6 | $LiNi_{0.8}Co_{0.1}Mn_{0.1}O_2$ | Evacuation up to 100 Pa | Air at reduced pressured | 20 | 95 | 82 |
| Example 7 | $LiNi_{0.8}Co_{0.1}Mn_{0.1}O_2$ | Filling with high purity argon gas after evacuation up to 1000 Pa | Argon | 200 | 92 | 83 |

TABLE 2

| | Cathode active material | Process of decreasing partial pressures of carbon dioxide and oxygen | Atmosphere in exterior body | Sum of partial pressures of oxygen and carbon dioxide [Pa] | Single cell capacity | Capacity retention rate after 50$^{th}$ cycle [%] |
|---|---|---|---|---|---|---|
| Comparative Example 1 | $LiNi_{0.8}Co_{0.15}Al_{0.05}O_2$ | Evacuation up to 2500 Pa | Air at reduced pressured | 500 | 88 | 75 |
| Comparative Example 2 | $LiNi_{0.8}Co_{0.15}Al_{0.05}O_2$ | Evacuation up to 5000 Pa | Air at reduced pressured | 1000 | 76 | 69 |
| Comparative Example 3 | $LiNi_{0.8}Co_{0.15}Al_{0.05}O_2$ | Evacuation up to 10000 Pa | Air at reduced pressured | 2000 | 74 | 65 |
| Comparative Example 4 | $LiNi_{0.8}Co_{0.15}Al_{0.05}O_2$ | N/A | Air | 21000 | 73 | 58 |
| Comparative Example 5 | $LiNi_{0.8}Co_{0.15}Al_{0.05}O_2$ | Filling with dry air after evacuation up to 100 Pa | Dry air | 21000 | 71 | 55 |
| Comparative Example 6 | $LiNi_{0.8}Co_{0.15}Al_{0.05}O_2$ | Filling with high purity carbon dioxide gas after evacuation up to 100 Pa | Carbon dioxide | 101300 | 45 | 23 |
| Comparative Example 7 | $LiNi_{0.8}Co_{0.15}Al_{0.05}O_2$ | Evacuation up to 2500 Pa | Air at reduced pressured | 500 | 84 | 78 |
| Comparative Example 8 | $LiNi_{0.8}Co_{0.15}Al_{0.05}O_2$ | Evacuation up to 5000 Pa | Air at reduced pressured | 1000 | 76 | 72 |
| Comparative Example 9 | $LiNi_{0.8}Co_{0.15}Al_{0.05}O_2$ | N/A | Dry air | 21000 | 66 | 50 |
| Comparative Example 10 | $LiCoO_2$ | Evacuation up to 100 Pa | Air at reduced pressured | 20 | 62 | 77 |
| Comparative Example 11 | $LiCoO_2$ | N/A | Dry air | 21000 | 56 | 72 |

As described above, according to an embodiment, when an all solid secondary battery comprises a lithium nickel oxide as a cathode active material, and energy density of the all solid secondary battery is improved.

It shall be understood that the embodiments described herein shall be considered in a descriptive sense only and not for purposes of limitation. Descriptions of features, advantages, or aspects within each exemplary embodiment shall be considered as available for other similar features, advantages, or aspects in other embodiments.

While an embodiment has been described with reference to the figures, it will be understood by those of ordinary skill in the art that various changes in form and details may be made herein without departing from the spirit and scope as defined by the following claims.

What is claimed is:

1. An all solid secondary battery comprising:
an exterior body;
a cathode comprising a cathode active material comprising a transition metal oxide;
an anode; and
a solid electrolyte layer disposed between the cathode and the anode,
wherein the cathode, the anode, and the solid electrolyte layer are disposed in the exterior body,
wherein the transition metal oxide is a lithium composite transition metal oxide comprising nickel and at least one metal element other than nickel that belongs to Group 2 to Group 13 of the periodic table, and
wherein a total of partial pressures of carbon dioxide and oxygen in the exterior body is 50 pascals or less.

2. The all solid secondary battery of claim 1, wherein the at least one metal element other than nickel is selected from cobalt, manganese, aluminum, and magnesium.

3. The all solid secondary battery of claim 1, wherein the transition metal oxide has a layered rock-salt structure.

4. The all solid secondary battery of claim 1, wherein the transition metal oxide is represented by Formula 1:

$$Li_xNi_yM_zO_2 \qquad \text{Formula 1}$$

wherein, in Formula 1,
M is at least one element selected from Co, Mn, Al, and Mg; and
x, y, and z are values that satisfy $0.5<x<1.2$, $0.5<y<1$, $0<z$, and $z=1-y$.

5. The all solid secondary battery of claim 4, wherein the transition metal oxide is represented by Formula 2:

$$Li_xNi_yCo_aM'_bO_2 \qquad \text{Formula 2}$$

wherein, in Formula 2,
M' is at least one element selected from Mn, Al, and Mg; and
x, y, and z are values that satisfy $0.9<x<1.1$, $0.5<y<1$, $0<a<0.3$, $0\leq b<0.3$, and $y+a+b=1$.

6. The all solid secondary battery of claim 5, wherein the transition metal oxide is represented by Formula 3:

$$Li_xNi_yCo_aAl_bO_2 \qquad \text{Formula 3}$$

wherein, in Formula 3, x, y, and z are values that satisfy $0.9<x<1.1$, $0.6<y<1.0$, $0<a<0.2$, $0<b<0.2$, and $y+a+b=1$.

7. The all solid secondary battery of claim 5, wherein the transition metal oxide is represented by Formula 4:

$$Li_xNi_yCo_aMn_bO_2 \qquad \text{Formula 4}$$

wherein, in Formula 4, x, y, and z are values that satisfy $0.9<x<1.1$, $0.6<y<1.0$, $0<a<0.2$, $0<b<0.2$, and $y+a+b=1$.

8. The all solid secondary battery of claim 5, wherein the transition metal oxide is represented by Formula 5:

$$Li_xNi_yCo_aMg_bO_2 \qquad \text{Formula 5}$$

wherein, in Formula 5, x, y, and z are values that satisfy $0.9<x<1.1$, $0.6<y<1.0$, $0<a<0.2$, $0<b<0.2$, and $y+a+b=1$.

9. The all solid secondary battery of claim 1, wherein an inert gas is disposed in the exterior body.

10. The all solid secondary battery of claim 9, wherein the inert gas is at least one gas selected from helium, nitrogen, neon, argon, krypton, and xenon.

11. The all solid secondary battery of claim 1, wherein the solid electrolyte layer comprises a sulfide solid electrolyte.

12. The all solid secondary battery of claim 1, wherein the solid electrolyte layer comprises a sulfide solid electrolyte which comprises sulfur, lithium, and at least one element selected from silicon (Si), boron (B), and phosphorous (P).

13. The all solid secondary battery of claim 1, wherein the solid electrolyte layer comprises a sulfide solid electrolyte which comprises $Li_2S—P_2S_5$.

14. The all solid secondary battery of claim 1, wherein in an infrared (IR) spectrum obtained from diffuse reflection IR measurement of the cathode active material after a first cycle of charging and discharging the battery, a peak is not observed within a range of about 1400 $cm^{-1}$ to about 1600 $cm^{-1}$.

15. A method of preparing an all solid secondary battery, the method comprising:
providing an all solid secondary battery by disposing a cathode comprising a cathode active material comprising a transition metal oxide represented by Formula 1, an anode, and a solid electrolyte layer disposed between the cathode and the anode within an exterior body $$Li_xNi_yM_zO_2 \qquad \text{Formula 1}$$

wherein, in Formula 1, M is at least one element selected from the group consisting of Co, Mn, Al, and Mg; and x, y, and z are values that satisfy $0.5<x<1.2$, $0.5<y<1$, $0<z$, and $z=1-y$; and
decreasing partial pressures of carbon dioxide and oxygen in the exterior body to 50 pascals or less.

16. The method of claim 15, wherein the decreasing of the partial pressures of carbon dioxide and oxygen in the exterior body comprises decreasing a total of partial pressures of carbon dioxide and oxygen in the exterior body to 200 pascals or less.

17. The method of claim 15, wherein the decreasing of the partial pressures of carbon dioxide and oxygen in the exterior body is performed by evacuating an inside of the exterior body.

18. The method of claim 15, wherein the decreasing of the partial pressures of carbon dioxide and oxygen in the exterior body is performed by disposing an inert gas in the exterior body.

* * * * *